United States Patent
Rapp et al.

(10) Patent No.: US 12,286,128 B2
(45) Date of Patent: Apr. 29, 2025

(54) METHOD AND SYSTEM FOR DETERMINING STEERING DEADBAND AND ELIMINATING STARTING DRAG

(71) Applicant: VIE TECHNOLOGY (EUROPE) KFT., Budapest (HU)

(72) Inventors: Tamás Rapp, Budapest (HU); Tamás Rózsa, Budapest (HU); Márton Lukács, Budapest (HU)

(73) Assignee: VIE TECHNOLOGY (EUROPE) KFT., Budapest (HU)

( * ) Notice: Subject to any disclaimer, the term of this patent is extended or adjusted under 35 U.S.C. 154(b) by 0 days.

(21) Appl. No.: 18/567,906

(22) PCT Filed: Apr. 29, 2022

(86) PCT No.: PCT/HU2022/050037
§ 371 (c)(1),
(2) Date: Dec. 7, 2023

(87) PCT Pub. No.: WO2022/259001
PCT Pub. Date: Dec. 15, 2022

(65) Prior Publication Data
US 2024/0270264 A1 Aug. 15, 2024

(30) Foreign Application Priority Data
Jun. 7, 2021 (HU) .................... 2100216

(51) Int. Cl.
B60W 50/02 (2012.01)
B60W 10/184 (2012.01)
B60W 10/20 (2006.01)

(52) U.S. Cl.
CPC ...... *B60W 50/0225* (2013.01); *B60W 10/184* (2013.01); *B60W 10/20* (2013.01); *B60W 50/0205* (2013.01); *B60W 2420/403* (2013.01)

(58) Field of Classification Search
CPC .......... B60W 50/0225; B60W 10/184; B60W 10/20; B60W 50/0205; B60W 2420/403;
(Continued)

(56) References Cited

U.S. PATENT DOCUMENTS 7,363,132 B2    4/2008  Lange et al.
2006/0015229 A1*  1/2006  Lange .................. B62D 1/00
                                                    701/41

FOREIGN PATENT DOCUMENTS

CN      113696878 A    11/2021
JP      2015221626 A   12/2015
(Continued)

*Primary Examiner* — Yi-Kai Wang (57) ABSTRACT

Method for determining steering deadband and eliminating starting drag in a vehicle, having at least one steered wheel mechanically connected to an actuator, includes, from a first initial position, wherein the actuator is in a middle position and is biased toward a second direction, the actuator is moved toward a first direction, the first direction being opposite to the second direction, until a movement of the steered wheel is detected in a first deadband detection position of the actuator. The actual position of the actuator in the first deadband detection position is stored as a first deadband value $\Theta_{DB1}$. After reaching the first deadband detection position, the actuator is moved further in the first direction by a predetermined $\Theta_{ESD1}$ first starting drag elimination angle to cause a predetermined movement of the at least one steering wheel and further mechanical parts connected thereto arriving to a first starting drag elimination position.

8 Claims, 5 Drawing Sheets

(58) Field of Classification Search
CPC ........ B62D 5/0457; B62D 15/00; B62D 5/04;
B60T 17/22; F16D 65/0025; G01M 17/06
USPC .......................................................... 701/41
See application file for complete search history.

(56) References Cited

FOREIGN PATENT DOCUMENTS

| | | |
|---|---|---|
| RU | 2457457 C1 | 7/2012 |
| RU | 2666060 C1 | 5/2018 |

\* cited by examiner

METHOD AND SYSTEM FOR DETERMINING STEERING DEADBAND AND ELIMINATING STARTING DRAG

The invention relates to a system and method for determining steering deadband and eliminating starting drag. More specifically, the invention relates to a method and system for automatically determining the steering deadband and automatically eliminating the starting drag issue at the start-up sequence of a vehicle in an optimized manner.

An ideal steering system provides an unequivocal relation between the position of the steering wheel and the orientation of a steered wheel. In reality, however, mechanical constraints of the steering system, wear or damage of certain mechanical elements and possible calibration errors cause a discrepancy between the steering wheel position and the orientation of the steered wheel.

Thus, the steering wheel usually has a quite noticeable deadband (also known as backlash or free play), i.e., a range of movement where the rotation of the steering wheel does not result in the rotation of the steered wheels. In fact, the driver of the road vehicle is obliged by law in many countries to test the deadband of the steering wheel on a regular basis, e.g., when the vehicle is used for the first time each day. This steering deadband has to be taken into consideration during driving and has to be compensated for. The test is usually done manually by the driver via rotating the steering wheel while observing when the steered wheel starts moving. Similarly, the compensation is also carried out by the driver according to the observed deadband and his driving experience.

The test is often omitted or performed incorrectly by the drivers due to negligence and the compensation is inherently inaccurate due to its manual nature, even if the test was performed correctly. Thus, it is advantageous to use an automated and accurate method and system to detect the steering deadband and to compensate steering accordingly.

The position of the steering wheel is usually measured to determine the driver's intention and to provide power assist to the steering. In order to determine possible faults in the steering system, the orientation of the steered wheel shall also be observed. Determining the steering angle of a steered wheel of a vehicle, especially a road vehicle, with more than one method contributes to driving safety by providing the ability to detect different faults of the steering system.

Autonomous vehicles lack a driver for carrying out the steering deadband test and also for detecting a failure of the steering system during operation. Therefore, automated testing means for the steering system is important to ensure road safety of autonomous vehicles.

Starting drag is the phenomenon of brake parts sticking together when a vehicle stands still for a prolonged time with the parking brakes engaged. Due to the adhesion of the brake parts, the brakes remain partially engaged even after releasing the parking brake and thus, provide some resistance against the movement of the vehicle. This unintended braking reduces the performance of the vehicle, increases fuel consumption and environmental pollution and causes unnecessary wear on the brake parts. The starting drag usually persists only for a relatively short time, until the movements of the wheels and frictional heating of brake parts result in the brakes finally snapping back to their normal disengaged position.

The starting drag issue occurs more often in smaller vehicles, e.g., personal cars due to two reasons. Braking systems of personal cars are usually held in open, disengaged position by springs and are engaged by the force exerted either a driver and/or a powered system when the brakes are activated. These braking systems are generally not as big and powerful as in larger vehicles, such as trucks, and thus, the adhesion between brake parts more easily overcomes the biasing force of relatively weak springs that bias the brake parts into released position. Large vehicles, e.g., trucks, with more powerful, often pneumatically operated braking systems are less susceptible to starting drag either because the stronger spring included in the brakes or because the parking brakes are actively disengaged by the pneumatic system against the biasing force of the parking brake springs biasing the brakes into engaged position.

The first significant recognition leading to the invention is that in the case of the steered wheels, disengagement of the stuck brake parts may be aided by a significant rotation the steered wheels around the steering axis. A further recognition of the invention is that said significant rotation of the steered wheels may be integrated into an automated method for determining steering deadband. Performing both the determination of the steering deadband and elimination of starting drag within the same start-up sequence increases road safety, while also result in better performance of the vehicle, longer lifetime of brake parts and less environmental pollution.

Determination of the steering deadband is preferably performed before starting the vehicle the first time each day, while the vehicle is stopped. This is usually performed by rotating the steering wheel in a first and then in a second direction until the steered wheel moves perceivably. In order to avoid undue wear on the tires, the method is performed carefully with the smallest perceivable movement possible, and thus, due to the very small movement range, this method is insufficient for eliminating starting drag.

A similar, but automated method for determining steering deadband is described in U.S. Pat. No. 7,363,132. The method described in the patent includes successive actuations of the steering mechanism, wherein the magnitude of each successive actuation is decreased until a first absence of movement of the ground wheels is detected. Depending on the number and magnitude of the actuations involving movement of the steered wheels, performing the method on hard surfaces is likely to cause undue wear on the tires. This problem is disregarded in the patented solution, as it is directed mainly on agricultural vehicles which are most often used on relatively soft soil. Though this automated method is suitable for determining steering deadband and includes significant movement of the steered wheels and thus, likely to eliminate starting drag, it is not suitable for road vehicles due to the significant wear caused of the tires.

Accordingly, the objective of the present invention is to provide a method and system for eliminating or at least alleviating drawbacks of the prior art solutions, i.e., to provide a method and system for determining steering deadband and for eliminating the starting drag issue without causing undue wear on the tires. A further objective of the present invention is to provide a method and system suitable for performing the steering deadband determination and starting drag elimination relatively quickly in order to prevent causing undue delays when a driver desires to start driving the vehicle.

The above objective has been achieved on one hand by a method according to the features of claim 1 and on other hand by a system according to the features of claim 8, respectively.

Preferred variations of the method and a preferred embodiment of the system, respectively, are set out in the dependent claims.

In what follows, the invention, especially preferred exemplary embodiments thereof are described in detail with reference to the accompanying drawings, wherein.

Figure 1:
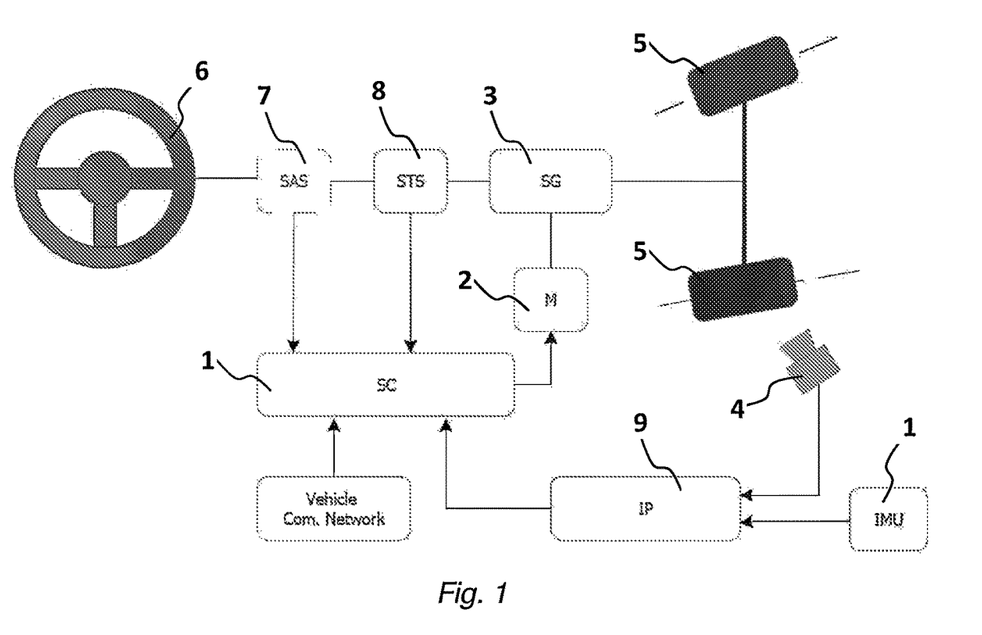
FIG. 1 shows a block diagram of a preferred embodiment of the system according to the invention.

FIG. 1 shows a block diagram of a preferred embodiment of the system according to the invention. The system according to the invention comprises a steering control computer 1, in data communication with at least one steering actuator 2 of a vehicle, wherein said at least one actuator 2 is mechanically connected via connecting components 3 to at least one steered wheel 5 of the vehicle, and the system further comprises at least one sensor 4 for detecting the movement of at least one steered wheel 5.

The steering control computer 1 may be integrated into the main computer of the vehicle or may be a separate computer unit. Preferably the steering control computer 1 is connected to the internal communication network of the vehicle, e.g., to the CAN bus. The steering control computer 1 issues steering demands to control the actuator 2. The steering demands may be in the form of a digital signal transmitted via a wire or wirelessly to an appropriate receiver of the actuator 2 or may be in the form power provided to the actuator with an appropriate voltage for an appropriate time. Accordingly, the steering demand may be issued in the form of an absolute position to be reached or alternatively a differential signal effecting an appropriate amount of movement relative to the current position. In the following part of the description, the term "steering demand" is used in the former meaning, i.e., an absolute position to be reached, but it should be understood that a signal controlling the actuator 2 in relation to its current position, calculated by the steering computer 1 is conceptually equivalent to this solution.

The actuator 2 may be an electric motor or a hydraulic cylinder and thus, its actual state could be described by a rotation angle or an extension length. For the sake of simplicity, the position of the actuator 2 are defined in the present specification in relation to an effective steering direction the position represents. For example, a position of positive 15° of the actuator 2 corresponds to a positive 15° steering direction of the vehicle when the steering deadband is zero, while the position of each connected steered wheel 5 is usually different due to the Ackerman steering geometry. For small angles of movement, i.e., less than 5 degrees, the movement of each steered wheel 5 may be taken to be the same with negligible error. This approximation is used in the present specification, but it is known to a person skilled in the art that corrections for larger angles should be applied. The position of the actuator 2 may be assumed to correspond to the steering demand after the time required for the corresponding movement has elapsed or alternatively the position of the actuator may be determined by an actuator position sensor.

The sensor 4 for detecting the movement of the steered wheel(s) 5 may be suitable for absolute position measurement or alternatively it may be only suitable for detecting movement. The sensor 4 may be formed by an imaging sensor, e.g., a camera, which may be connected to the steering computer 1 directly or via a separate image processing unit 9. Optionally an inertial measurement unit 10 is in data communication with the image processing unit 9 or with the steering computer 1 for providing correction data for correcting the measurements of the sensor 4. Alternatively, the sensor 4 may be any other type of sensor suitable for detecting movement, e.g., a proximity detector or position sensor operating on inductive, photoelectric, capacitive or other electromagnetic principle.

Depending on the vehicle, a steering wheel 6 may be present for manual control of the steering wheels 5, that is mechanically connected to the steered wheels 5 and a steering angle sensor 7 and a steering torque sensor 8 may be present for sensing the movement and torque applied to the steering wheel 6 by a driver to determine the dynamics and amount of power assist to be provided by the actuator(s) 2. In this case, the steering angle sensor 7 and the steering torque sensor 8 are in direct or indirect data communication with the steering computer 1.

In the case of "steer-by-wire" solutions, there is no mechanical connection between the steering wheel 6 and the steered wheel(s) 5 and a steering torque sensor 7 may also be absent.

In the case of completely automated vehicles or remote controlled vehicles, the steering wheel 6, the steering angle sensor 7 and the steering torque sensor 8 may be completely absent.

The steering control computer 1 is configured for performing any of the methods described in the following.

Figure 2:
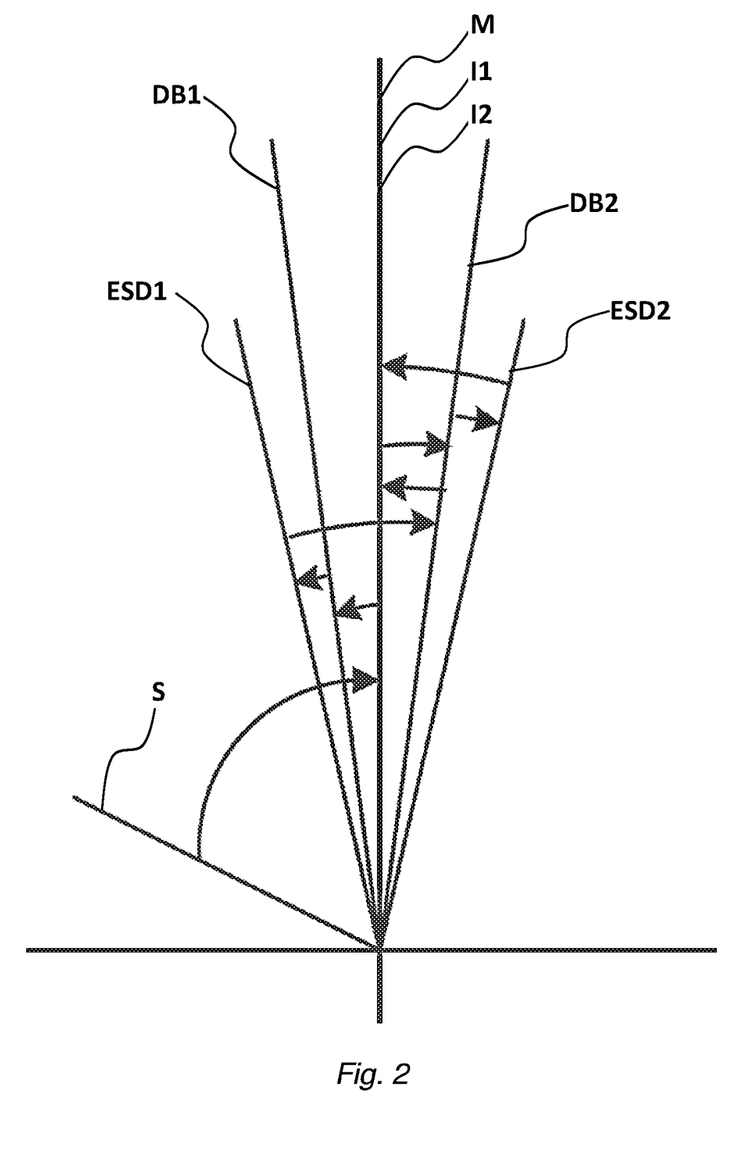
FIG. 2 illustrates movements of the actuator of the steering system in a preferred variant of the method according to the invention.
Figure 3:
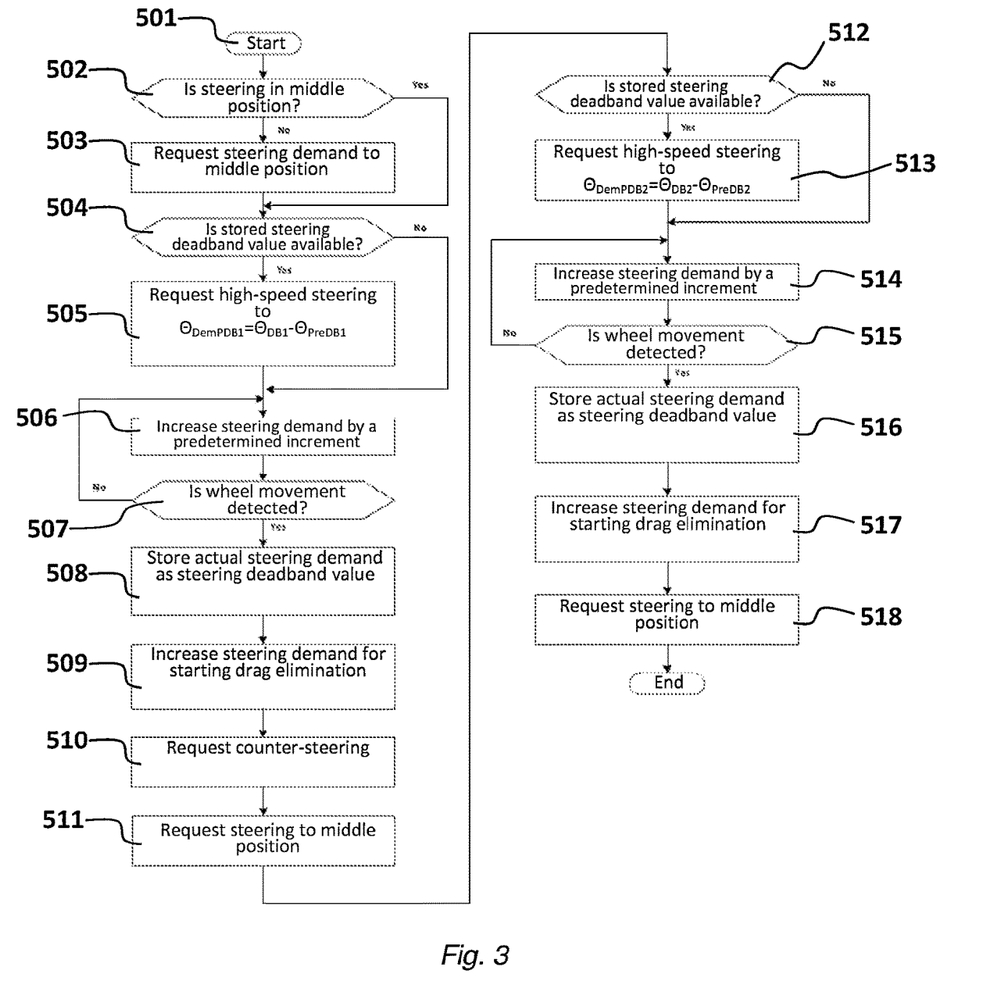
FIG. 3 shows a flow chart of the method illustrated on FIG. 2.

FIG. 2 illustrates movements of the actuator of the steering system in a preferred variant of the method according to the invention and FIG. 3 shows a flowchart of said method. The movements illustrated in FIG. 2 are shown arrows, while the order of movements is shown by the arrangement of the arrows: the bottom arrow representing the first movement, and the top arrow representing the last one. A middle position M of the steered wheels is defined by the straight traveling of the vehicle or geometrically by a symmetric position of the steered wheel(s) in relation to a longitudinal median plane of the vehicle. The actual position of the steered wheels in the middle position M is usually slightly offset from the straight position by angle called 'toe angle' or 'tracking angle' and to a smaller extent by the caster angle and camber angle. A middle position M of the actuator is defined as the position of the actuator corresponding to the middle position M of the steered wheels in the idealized state when the steering deadband is zero and the components of the steering system are not biased in either direction. A component is understood to be biased in a given direction when said component encounters higher resistance against movement in said direction than in the opposite direction. For example, during steering to the right, the steered wheels the actuator and mechanical components therebetween encounter higher resistance against further movement to said direction than they would encounter in the other direction.

Though the present specification will refer to the most usual situation, when a vehicle has one pair of steered wheels, it should be understood that the method of the present invention may be applied to any number of steered wheels, for example, two pairs, three pairs, four pairs or even more steered wheels or in special cases to odd number of steered wheels, for example one steered wheel.

The method according to the invention is preferably started 501 upon receipt of an activation command that may be a manually activated command by the driver or a technician or an automatic activation command provided by a computer system that may be on-board the vehicle or may be an external remote controlling computer. The source of the activation command is preferably an on-board computer of the vehicle, especially when the vehicle is a self-driving vehicle or a personal vehicle, and the activation command is provided in the course of the start-up procedure of the vehicle, e.g., when the driver activates the vehicle by inserting and turning the activation key or by using an electronic authentication device from within the vehicle or from a remote location.

When the activation command for the method according to the invention is received 501 by the steering control computer 1 of the vehicle, as a preferable optional first step, a middle position M of the actuator is achieved. This may be carried out by checking the actual position $\Theta_{Act}$ of the actuator in the starting position S and determining 502 whether it is within a tolerance range around the middle position M. If it is not, a steering demand is issued 503 to move the actuator into the middle position M, which is by convention the null position described by a steering angle $\Theta$ of 0 degrees. Angles to the left of the null position and rotations to the counterclockwise direction have positive signs, while angles and rotations to the right (clockwise) direction have negative signs. Alternatively, the middle position M of the actuator may be ensured by returning the actuator into the middle position M after the vehicle has been parked and thus, the actuator will be in the middle position M upon the next startup and thus, neither the position determination 502, nor issuing a steering demand 503 is necessary. If there is a steering wheel in the vehicle and it is in direct mechanical connection with the steered wheel(s) of the vehicle, sudden movement of the actuator and thus, of the steering wheel would cause discomfort to a driver holding the steering wheel or could even cause slight injury. In order to avoid causing any discomfort or injury, the driver may be alerted to remove their hands from the steering wheel and/or a mechanical, electrical or optical sensor may be used to determine whether the driver is holding the steering wheel and issuing 503 the steering demand may be halted until the driver removes their hands from the steering wheel.

Steering deadband is preferably measured in the vicinity of the middle position M for several reasons. The steering deadband is usually the greatest in the vicinity of the middle position due to the mechanical steering components are subjected to the most wear in the vicinity of the middle position M and thus, the unsafe state of the system that is defined by the largest error may be determined with the highest confidence in this range. Also, the precision of the measurement is also the best in the vicinity of the middle position M, because at higher steering angles, the actual positions of the steered wheels relative to the middle position M differ significantly due to the Ackermann steering geometry and thus, causing larger measurement errors at larger angles.

A first direction is defined as the opposite of the direction of movement of the actuator by which the middle position M has been achieved. If this information is unavailable, it may be selected arbitrarily. In this example, the starting position S is to the left of the middle position M and thus, the first direction is counterclockwise (positive) and the second direction is clockwise (negative). Upon reaching the middle position M, the actuator, the steered wheels and the steering components therebetween are biased toward the second direction, which is suitable for providing a consequent starting point for the measurement of the steering deadband in the first direction, and thus, the middle position serves as a first initial position I1 for a first deadband measurement.

Next, the actuator is moved in the first direction until a movement of the steered wheel is detected. In the moment, when the movement of the steered wheel in the first direction is detected, the actuator is in the first deadband detection position DB1. Depending on the type of sensor used for determining wheel movement, this may be performed in a single continuous step or is preferably performed as a sequence of the following steps for quicker measurement. It is determined 504, whether a stored deadband value is available for the first direction. If a stored value is available (either from a previous measurement or as factory default value), then a steering demand is issued 505 to achieve a position in the vicinity of the end of the suspected deadband region at a relatively high speed, e.g., at a speed corresponding to an angular speed of 10°/s of the steered wheels. This step may be described by the formula $\Theta_{DemPDB1}=\Theta_{DB1}-\Theta_{PreDB1}$, wherein $\Theta_{DemPDB1}$ is the angle of issued steering demand, $\Theta_{DB1}$ is the stored deadband value for the first direction, and $\Theta_{PreDB1}$ is a precise measurement range that may be a preset fixed value, e.g., 0,3° or may be a value derived from the first deadband value, e.g., $\Theta_{PreDB1}$ may be 10% of $\Theta_{DB1}$. In the vicinity of the end of the deadband range, i.e., within $\Theta_{PreDB1}$ of the expected deadband value, a slower motion of the actuator is preferred for more accurate measurement. The accuracy of the measurement is usually limited by the smallest detectable movement of the steered wheel, i.e., the measurement limit of the sensor, and thus, $\Theta_{PreDB1}$ is preferably selected to be the amount of movement of the actuator that corresponds to the smallest movement of the steered wheel detectable by the sensor. $\Theta_{PreDB1}$ has the same sign as $\Theta_{DB1}$. As this position is achieved, steering angle is preferably increased at a lower speed, e.g., corresponding to a wheel movement speed of 1°/s, until wheel movement can be detected. This may be performed as two steps of increasing the steering demand 506 by a small increment, e.g., 0,1°, then checking 507 whether a wheel movement is detected, and repeating these two steps in rapid succession until wheel movement is detected.

When wheel movement is detected, the actual steering angle demand $\Theta_{Act}$ can be used to update or set 508 steering deadband information for the first direction, i.e., $\Theta_{DB1}=\Theta_{Act}$. This concludes the deadband measurement in the first direction and according to the invention, the actuator is moved further 509 in the first direction by a predetermined starting drag elimination angle thus, arriving in a first starting drag elimination position ESD1. This step may be described by the formula $\Theta_{DemESD1}=\Theta_{DB1}+\Theta_{ESD1}$, wherein $\Theta_{DemESD1}$ is the total steering demand corresponding to the starting drag elimination position ESD1, $\Theta_{DB1}$ is the deadband value for the first direction, and $\Theta_{ESD1}$ is the predetermined starting drag elimination angle in the first direction, e.g., an angle between 3° and 5°, that heavily depends on the actual steering system and brake system of the vehicle and thus, it is preferably determined for each vehicle hosting the system according to the invention. Said further movement 509 of the actuator is preferably performed at a relatively low speed, e.g., 3°/s, because this step includes movement of the wheel relative to the ground and higher speeds would cause higher shearing forces on the tire thus, causing more wear. At the same time, the speed should be as large as possible without causing undue wear, in order to keep the time required for performing the whole process to the minimum.

At this point, the method may be finished by assuming that the deadband in the second direction is the same as in the first direction, and by assuming that the starting drag is eliminated. However, performing the deadband measurement again in the second direction provides higher accuracy and is thus, preferred. Also, performing the starting drag elimination step in the second direction increases the reliability of the starting drag elimination.

In order to ensure accurate measurement of the deadband in the second direction, the next steps preferably set the steered wheels to the middle position so that the steered wheels, the actuator and further components therebetween are biased in the first direction. This may be achieved by the following steps. A counter steering is requested 510 in the second direction that corresponds to the expected second deadband position DB2. If a stored second deadband value is available, it is preferably used for this purpose, otherwise the first deadband value may be used with good approximation. The value of counter steering demand is preferably calculated according to the formula $\Theta_{DemCounter}=\Theta_{DB2}$ or $\Theta_{DemCounter}=-\Theta_{DB1}$ wherein $\Theta_{DemCounter}$ is the counter steering demand, $\Theta_{DB2}$ is the stored second deadband value, $\Theta_{DB1}$ is the recently updated first deadband value. More preferably, the accuracy of the sensor is also accounted for when requesting counter steering, i.e., the counter steering demand is preferably calculated according to the formulae $\Theta_{DemCounter}=\Theta_{DB2}+\Theta_{PreDB2}$ or $\Theta_{DemCounter}=-\Theta_{DB1}+\Theta_{PreDB2}$, wherein $\Theta_{DemCounter}$ is the counter steering demand, $\Theta_{DB2}$ is the stored second deadband value, $\Theta_{DB1}$ is the recently updated first deadband value, and $\Theta_{PreDB2}$ is preferably equal to $-\Theta_{PreDB1}$, i.e., it has the same size, but opposite sign as $\Theta_{PreDB1}$. Next, a steering demand to the middle position M is requested, thus, a second initial position I2 is achieved for an accurate measurement of the deadband in the second direction.

Preferably the deadband is measured in the second direction via the following steps. The actuator is moved in the second direction until a movement of the steered wheel is detected. In the moment, when the movement of the steered wheel in the first direction is detected, the actuator is in the second deadband detection position DB2. This may be performed in a single step or is preferably performed as a sequence of the following steps for quicker measurement. It is determined 512, whether a stored deadband value is available for the second direction. If a stored value is available (either from a previous measurement or as factory default value), then a steering demand is issued 513 to achieve a position in the vicinity of the end of the suspected deadband region at a relatively high speed, e.g., at a speed corresponding to an angular speed of 10°/s of the steered wheels. This step may be described by the formula $\Theta_{DemPDB2}=\Theta_{DB2}-\Theta_{PreDB2}$, wherein $\Theta_{DemPDB2}$ is the angle of issued steering demand, $\Theta_{DB2}$ is the stored deadband value for the second direction, and $\Theta_{PreDB2}$ may be a preset fixed value, e.g., 0,3° or may be a value derived from the second deadband value, e.g., $\Theta_{PreDB2}$ may be 10% of $\Theta_{DB2}$. In the vicinity of the end of the deadband range, i.e., within $\Theta_{PreDB2}$ of the expected deadband value, a slower motion of the actuator is preferred for more accurate measurement. $\Theta_{PreDB2}$ has the same sign as $\Theta_{DB2}$ and preferably $\Theta_{PreDB2}=-\Theta_{PreDB1}$. As this position is achieved, steering angle is preferably increased at a lower speed, e.g., corresponding to a wheel movement speed of 1°/s, until wheel movement can be detected. This may be performed as two steps of increasing the steering demand 514 by a small increment, e.g., 0,1°, then checking 515 whether a wheel movement is detected, and repeating these two steps in rapid succession until wheel movement is detected.

When wheel movement is detected, the actual steering angle demand $\Theta_{Act}$ can be used to update or set 516 steering deadband information for the second direction, i.e., $\Theta_{DB2}=\Theta_{Act}$. This concludes the deadband measurement in the second direction. At this point, the steered wheel has already been moved to the second direction by an amount of $|\Theta_{ESD1}|$ during the counter steering step 510, thus, some starting drag elimination effect is also produced in the second direction. Accordingly, a further starting drag elimination step is optional. In the preferred exemplary variant shown in FIGS. 2 and 3, a further starting drag elimination step is included via further movement 517 of the actuator in the second direction by a predetermined starting drag elimination angle thus, arriving in a second starting drag elimination position ESD2. This step may be described by the formula $\Theta_{DemESD2}=\Theta_{DB2}+\Theta_{ESD2}$, wherein $\Theta_{DemESD2}$ is the total steering demand corresponding to the second starting drag elimination position ESD2, $\Theta_{DB2}$ is the deadband value for the second direction, and $\Theta_{ESD2}$ is the predetermined starting drag elimination angle in the second direction, e.g., of the same size as $\Theta_{ESD1}$, but with opposite sign, or alternatively a $\Theta_{ESD2}$ may be a smaller angle then $\Theta_{ESD1}$ to account for the movement in the second direction already performed in the counter steering step 510. For the sake of convenience of the driver in manually driven cars, optionally the method may be concluded by issuing a steering demand 518 for returning to the middle position M.

The method optionally further comprises comparing the measured deadband with a threshold value and taking a further step on the basis of the comparison, e.g., providing a warning if the deadband exceeds the threshold.

The method optionally further comprises using the measured deadband value as a correction in the steering demands provided during automatic or manual driving of the vehicle to steer the vehicle more precisely according to the commands provided by the driver or control computer.

The above method provides great precision for determining the steering deadband, while also eliminating the starting drag—all this without causing undue wear of the tires, whose total movement relative to the ground may be as small as e.g., 6°, but most likely remain lower than 15°. The predetermined starting drag elimination angle is preferably chosen so as be the lowest possible angle still suitable for reliably eliminating starting drag.

Figure 4:
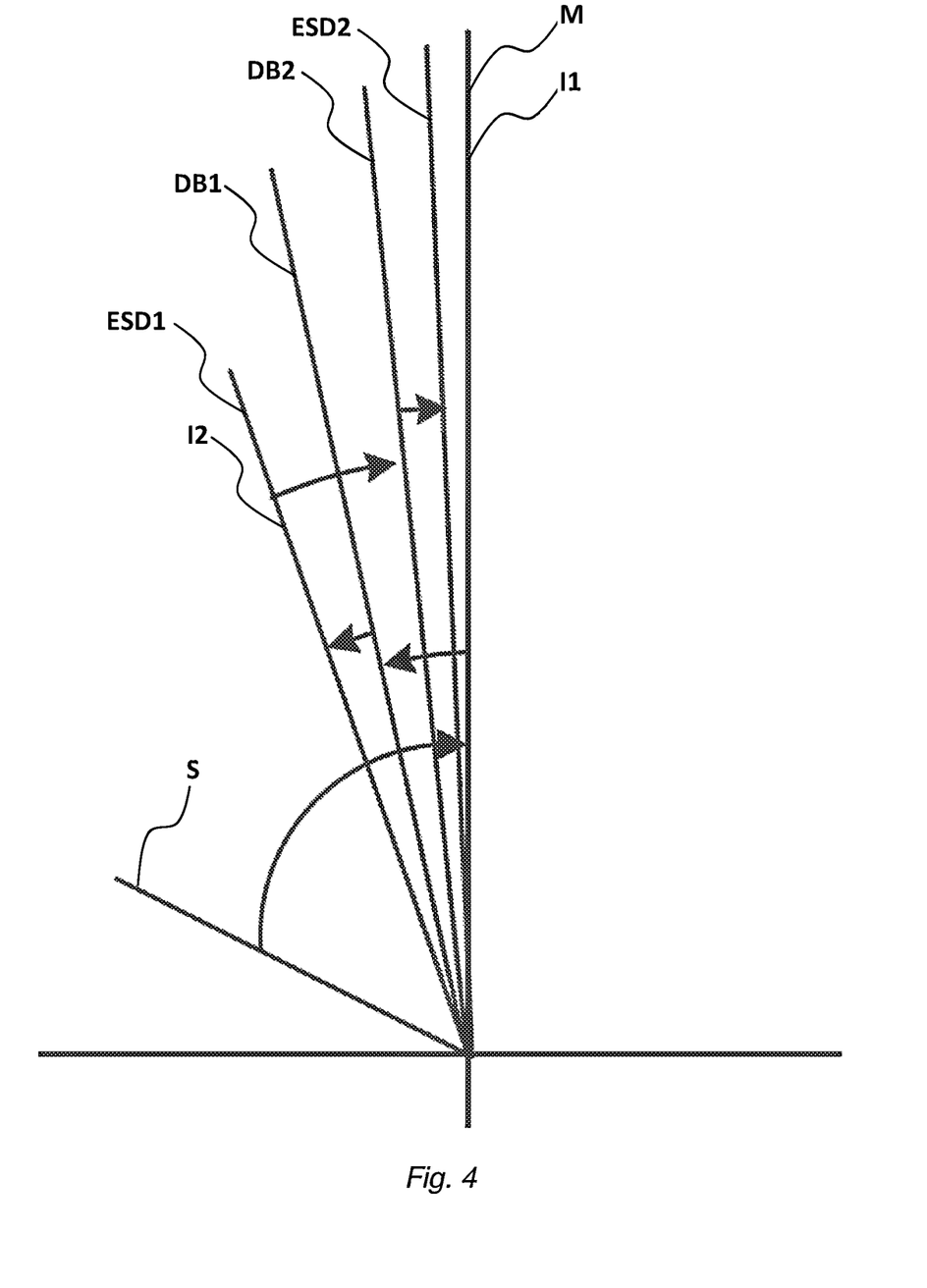
FIG. 4 illustrates movements of the actuator of the steering system in a preferred embodiment of the method according to the invention.
Figure 5:
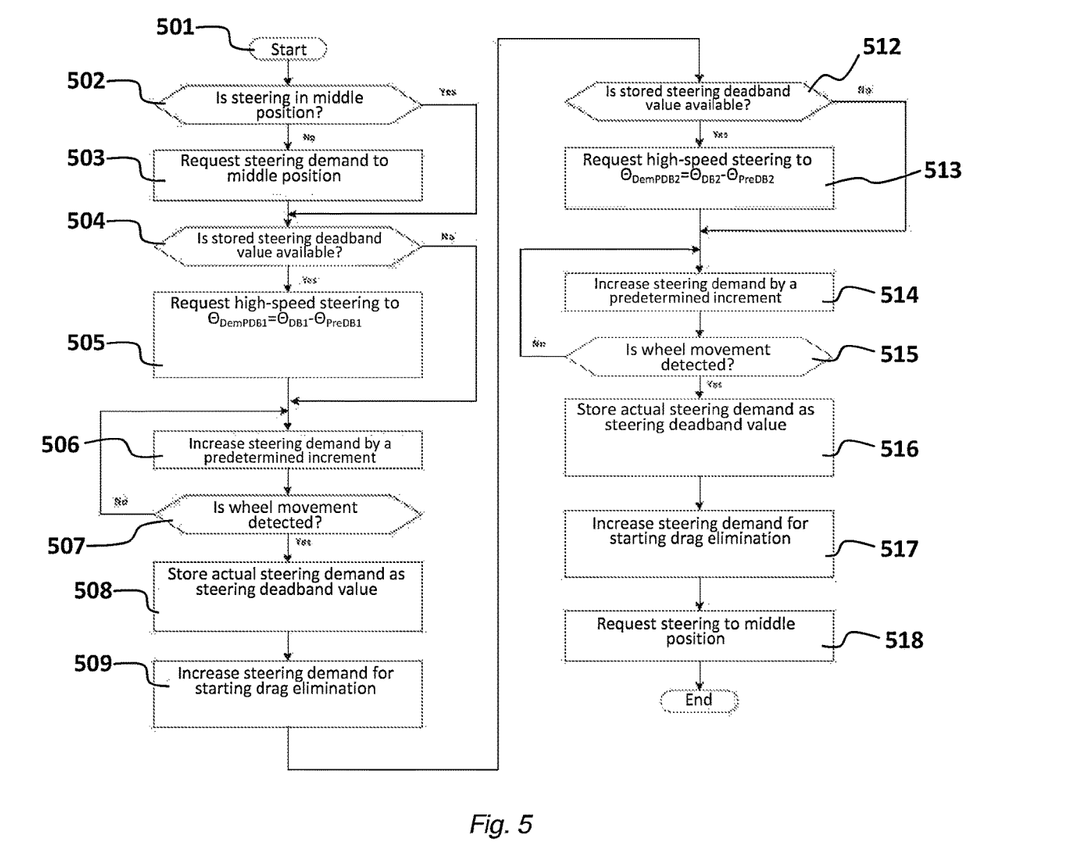
FIG. 5 shows a flow chart of the method illustrated on FIG. 4.

FIG. 4 illustrates movements of the actuator of the steering system in a further preferred variant of the method according to the invention and FIG. 5 shows a flowchart of said method. The movements illustrated in FIG. 4 are shown arrows, while the order of movements is shown by the arrangement of the arrows: the bottom arrow representing the first movement, and the top arrow representing the last one.

This variant of the method is performed in fewer steps, causing less movement of the corresponding moving parts, resulting in quicker execution and less wear on the mechanical parts involved, at the cost of some measurement precision. According to the variant shown in FIGS. 4 and 5, the same steps are performed for measuring the deadband in the first direction and for eliminating the starting drag in the first direction, as in the first embodiment shown in FIGS. 2 and 3, i.e., steps 501-509 are performed without change. For the sake of conciseness, these are not repeated.

After finishing the starting drag elimination step 509 in the first direction, the steered wheels, the actuator and the components therebetween are biased in the first direction, thus, providing an almost ideal initial position I2 for measuring the starting drag in the second direction. In the ESD2 position the position of the steered wheels differs from the middle position only by the amount of the starting drag elimination angle $\Theta_{ESD1}$, which is only a few degrees and thus, the position is sufficiently close to the middle position M for providing accurate measurement results regarding the steering deadband.

Accordingly, in the variant of the method shown in FIGS. 4 and 5, the starting drag elimination step 509 is followed directly by measuring the steering deadband in the second direction, which is preferably performed via the following steps. The actuator is moved in the second direction until a movement of the steered wheel is detected. In the moment, when the movement of the steered wheel in the first direction is detected, the actuator is in the second deadband detection position DB2. This may be performed in a single step or is preferably performed as a sequence of the following steps for quicker measurement. It is determined 512, whether a stored deadband value is available for the second direction. If a stored value is available (either from a previous measurement or as factory default value), then a steering demand is issued 513 to achieve a position in the vicinity of the end of the suspected deadband region at a relatively high speed, e.g., at a speed corresponding to an angular speed of 10°/s of the steered wheels. This step may be described by the formula $\Theta_{DemPDB2}=\Theta_{ESD1}+\Theta_{DB2}-\Theta_{PreDB2}$, wherein $\Theta_{DemPDB2}$ is the angle of issued steering demand, $\Theta_{ESD1}$ is the predetermined starting drag elimination angle in the first direction, $\Theta_{DB2}$ is the stored deadband value for the second direction, and $\Theta_{PreDB2}$ may be a preset fixed value, e.g., 0,3° or may be a value derived from the second deadband value, e.g., $\Theta_{PreDB2}$ may be 10% of $\Theta_{DB2}$. In the vicinity of the end of the deadband range, i.e., within $\Theta_{PreDB2}$ of the expected deadband value, a slower motion of the actuator is preferred for more accurate measurement. $\Theta_{PreDB2}$ has the same sign as $\Theta_{DB2}$ and preferably $\Theta_{PreDB2}=-\Theta_{PreDB1}$. As this position is achieved, steering angle is preferably increased at a lower speed, e.g., corresponding to a wheel movement speed of 1°/s, until wheel movement can be detected. This may be performed as two steps of increasing the steering demand 514 by a small increment, e.g., 0,1°, then checking 515 whether a wheel movement is detected, and repeating these two steps in rapid succession until wheel movement is detected.

When wheel movement is detected, the actual steering angle demand $\Theta_{Act}$ can be used to update or set 516 steering deadband information for the second direction, i.e., $\Theta_{DB2}=\Theta_{Act}-\Theta_{ESD1}$. This concludes the deadband measurement in the second direction. In this variant of the method, at this point, the steered wheel has not yet moved to the second direction and thus, a further starting drag elimination step is highly preferred. Accordingly, the actuator is preferably moved further 517 in the second direction by a predetermined starting drag elimination angle thus, arriving in a second starting drag elimination position ESD2. This step may be described by the formula $\Theta_{DemESD2}=\Theta_{DB2}+\Theta_{ESD2}$, wherein $\Theta_{DemESD2}$ is the total steering demand corresponding to the second starting drag elimination position ESD2, $\Theta_{DB2}$ is the deadband value for the second direction, and $\Theta_{ESD2}$ is the predetermined starting drag elimination angle in the second direction, e.g., of the same size as $\Theta_{ESD1}$, but with opposite sign. Usually, when the steering deadband is about the same in both directions and when the detection threshold for detecting wheel movement is also the same, the ESD2 position will be about at the middle position M and thus, automatically provides a convenient starting point for the driver of the vehicle if it is driven manually.

The above method provides good precision for determining the steering deadband, while also eliminating the starting drag, while causing the lowest possible wear on the tires and other mechanical components of the steering system. The predetermined starting drag elimination angle is preferably chosen so as be the lowest possible angle suitable for eliminating starting drag.

The invention claimed is:

1. A method for determining steering deadband and for eliminating starting drag in a vehicle having at least one steered wheel (5) mechanically connected to an actuator (2), comprising:
   a) from a first initial position (I1), wherein the actuator (2) is in a middle position (M) and is biased toward a second direction, the actuator is moved toward a first direction, said first direction being opposite to the second direction, until a movement of the steered wheel (5) is detected in a first deadband detection position (DB1) of the actuator (2);
   b) the actual position of the actuator (2) in the first deadband detection position (DB1) is stored (508) as a first deadband value $\Theta_{DB1}$, characterized in that
   c) after reaching the first deadband detection position (DB1), the actuator (2) is moved further (509) in the first direction by a predetermined $\Theta_{ESD1}$ first starting drag elimination angle to cause a predetermined movement of the at least one steering wheel (5) and further mechanical parts connected thereto, including at least one brake arranged for braking the at least one steering wheel (5), arriving to a first starting drag elimination position (ESD1).

2. The method according to claim 1, characterized in that the method further comprises, after step c) is finished:
   d) providing a second initial position (I2), wherein the actuator (2) is in a middle position (M) and is biased toward the first direction by:
      moving (510) the actuator into an estimated second deadband detection position (DB2) that is calculated to be in the second direction from the middle position (M) by an angle of a stored second deadband value $\Theta_{DB2}$ or in the absence of a stored second deadband value $\Theta_{DB2}$, by the angle of the stored first deadband value $\Theta_{DB1}$;
      moving (511) the actuator to the middle position (M) thus, achieving said second initial position (I2);
   e) from the second initial position (I2), the actuator (2) is moved toward the second direction, until a movement of the at least one steered wheel (5) is detected in a second deadband detection position (DB2) of the actuator (2);
   f) the actual position of the actuator (2) in said second deadband detection position (DB2) is stored (516) as a second deadband value $\Theta_{DB2}$.

3. The method according to claim 2, characterized in that the method further comprises, after step f) is finished:
   further movement (517) of the actuator (2) in the second direction by a predetermined $\Theta_{ESD2}$ second starting drag elimination angle to cause a predetermined movement of the at least one steering wheel (5) and further mechanical parts connected thereto, including at least one brake arranged for braking said at least one steered wheel (5), arriving to a second starting drag elimination position (ESD2).

4. The method according to claim 1, characterized in that the steering deadband determination step(s) a) and/or e) comprise(s):

a precise measurement position in the vicinity of the expected deadband detection position is approached by the actuator (2) at a first speed and precise measurement of the deadband is performed at a second speed, wherein said first speed is larger than said second speed, wherein the expected deadband detection position is defined by a stored deadband value $\Theta_{DB1}$ and/or $\Theta_{DB2}$; and wherein the precise measurement position precedes the expected deadband detection position in the order of movement of the actuator (2) by a precise measurement range $\Theta_{PreDB1}$ and/or $\Theta_{PreDB2}$.

5. The method according to claim 1, characterized in that the steering deadband determination step(s) a) and/or e) comprise(s):

increasing a steering demand (506) issued to the actuator (2);
checking (507) whether a corresponding steered wheel (5) has moved relative to its position before increasing the steering demand (506);
repeating the steps of increasing the steering demand (506) and checking (507) wheel movement until wheel movement is detected.

6. The method according to claim 1, characterized in that before step a) of the method, the following steps are performed:

a start command is received (501);
it is checked (502), whether the actual position of the actuator (2) is within a tolerance range of the middle position (M);
if the actuator (2) is not within a tolerance range of the middle position (M), the actuator is moved (503) to the middle position (M).

7. A system for determining steering deadband and for eliminating starting drag in a vehicle having at least one steered wheel (5) operably connected to an actuator (2), said system comprising:

a sensor (4) for detecting movement of said at least one steered wheel (5);
a steering control computer (1), for performing a method according to claim 1, wherein said steering control computer (1) is in data communication with the actuator (2) and the sensor (4).

8. The system according to claim 7, wherein the sensor (4) is a camera.

\* \* \* \* \*